United States Patent Office 2,765,667
Patented Oct. 9, 1956

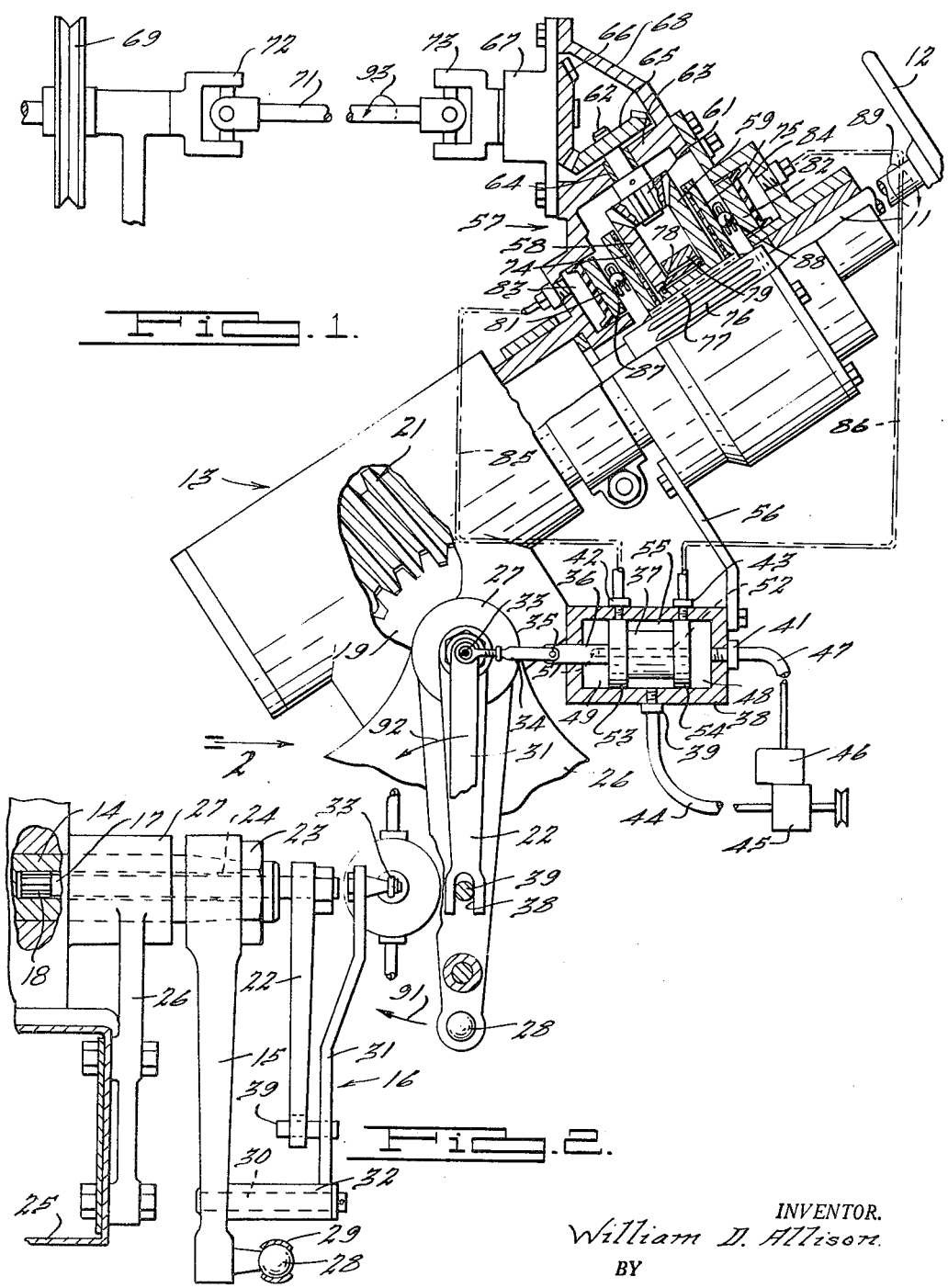

2,765,667

POWER STEERING ASSIST MECHANISM

William D. Allison, Grosse Pointe, Mich., assignor to Hupp Corporation, Cleveland, Ohio, a corporation of Virginia Application April 20, 1953, Serial No. 349,602

10 Claims. (Cl. 74—388)

This invention relates to power steering mechanisms, and more particularly to arrangements for utilizing engine power for assisting the steering effort of a vehicle operator in response to movement of the steering wheel in either direction.

In a previous invention (Allison Patent No. 2,427,340, issued September 16, 1947) the deformation or torsional twisting of the steering gear cross shaft has been utilized to actuate the controlling element of a power apparatus for a steering assist mechanism. It is an object of the present invention to provide an improved power apparatus in combination with a deformation type controlling element as described in the above mentioned patent, whereby a mechanical assisting force is applied to the steering linkage when the steering shaft is turned against a resisting load.

It is another object to provide an improved steering assist mechanism of the above nature, in which the mechanical actuation is derived directly from the vehicle engine, thus eliminating the necessity of a separate source of motive power.

It is a further object to provide an improved steering assist mechanism of the above nature, in which the actuating mechanism may be installed directly on the steering shaft or at other points in the steering linkage.

It is another object to provide an improved steering assist mechanism having the above characteristics, with means for variably controlling the amount of assist effort in accordance with the steering effort of the operator, so that the application and release of the assisting effort is smooth and gradual and reflects the resistance encountered by the operator.

It is a further object of the invention to provide an improved steering assist mechanism of the above nature, which has an inherent follow-up mechanism for returning the power drive to its neutral condition whenever the operator is not applying steering effort to the wheel.

It is also an object to provide a steering assist mechanism of the above nature, in which the means for sensing the steering effort of the operator includes an arrangement for amplifying the sensing movement, whereby the assist mechanism is more sensitive to changes in the steering effort and is not dependent upon large deflections of the pitman arm.

Other objects, features, and advantages of the present invention will become apparent from the subsequent description, taken in conjunction with the accompanying drawings.

In the drawings:

Figure 1 is a side elevational view partly in cross-section of a steering column and its attendant worm and sector, showing the steering assist mechanism applied to the steering shaft, with the driving connection from the engine crankshaft; and Figure 2 is a fragmentary front elevational view taken in the direction of arrow 2 of Figure 1 and showing the arrangement of the sensing linkage.

The invention is adapted to be applied to a conventional vehicle steering mechanism including a steering shaft 11 having a steering wheel 12 at its upper end and a worm and sector housing generally indicated at 13 at the lower end thereof. The cross shaft 14 on the output side of the worm and sector assembly is connected by pitman arm 15 to the steering linkage in the conventional manner, and a sensing linkage, generally indicated at 16 and described in detail below, serves to control the power assist mechanism in response to bending in cross shaft 14 caused by road resistance to the operator's turning effort. This principle of control by torsional bending of the cross shaft is described in Allison Patent No. 2,427,340, and in the present embodiment a valve control shaft 17 is disposed within cross shaft 14 and extends outwardly therefrom, the inner end of shaft 17 being fixed at 18 to the cross shaft. The latter carries sector 19 thereon which is driven by worm 21 within housing 13. The outer end of shaft 17 has a control pitman arm 22 fixed thereto, and it will thus be seen that when cross shaft 14 is turned by worm 21 against road resistance, a torsional force will be set up in cross shaft 14 while control shaft 17 is free to rotate without stress. There will therefore be angular displacement between the outer ends of shafts 14 and 17 which will, as seen below, control the operation of the steering assist mechanism. Pitman arm 15 may be secured to the end of cross shaft 14 by lock nut means 23, and a bushing 24 may be disposed within the outer end of cross shaft 14 for rotatably supporting control shaft 17. The entire assembly is preferably secured to chassis 25 of the vehicle by such means as a bracket 26 which extends from bearing portion 27 of housing 13.

The outer end of pitman arm 15 carries an extension 28 for connection to drag link 29 or other portion of the steering linkage, and the pitman arm also carries a pin 30 to which the lower end of a valve actuating arm 31 is pivotally connected by means of a pivot bearing 32. The upper end of arm 31 is pivotally connected at 33 with one end of a link 34, the other end of which is connected at 35 with a control rod 36 for a spool valve 37 which acts as a control valve for the steering mechanism. Link 34 may if desired be of adjustable length, for example, with a conventional turnbuckle arrangement, in order to adjust the neutral position of the valve, and with the valve in neutral position pivot 33 is preferably on the axis of shafts 14 and 17 for reasons described below. Control pitman arm 22 is connected at its outer end to arm 31 by a pin and slot connection including a slot 38 at the lower end of arm 22 and a pin 39 extending from arm 32. It will therefore be seen that upon relative angular movement between pitman arm 15 and control pitman arm 22, such as is caused by the torsion in cross shaft 14 described above, angular movement will be imparted to arm 31, this arm moving about pivot pin 30. The pivot 33 carried by link 32 will therefore be displaced from its normal position on the axis of shafts 14 and 17 and move so as to adjust spool valve 37 in either direction.

The spool valve is enclosed within a housing 38 which has an inlet port 39, an exhaust port 41 and control ports 42 and 43. Inlet port 39 is connected by conduit 44 to a hydraulic pump 45 which may be driven from the engine (not shown), and exhaust port 41 is connected to a reservoir 46 by conduit 47, the exhaust port leading from end chamber 48 of the valve housing. The other end chamber 49 of the housing is connected to chamber 48 by means of a radial port 51 and an axial port 52 extending through valve stem 36. Valve 37 has lands 53 and 54 which normally cover control ports 42 and 43 respectively. However, when the valve is moved axially, central chamber 55 is connected to one of the control ports 42 or 43, the other port being connected to exhaust by means of end chambers 48 or 49. The extent to which fluid pressure is admitted to control ports 42 or 43 depends of course on the extent of movement of valve 37 in exposing one or the other of these ports to central chamber 55. Valve housing 38 may be mounted on the assembly by means of a bracket 56 as shown in Figure 1.

Mounted on the steering wheel column is a clutch and gear housing generally indicated at 57 which encloses the gear driving means for the steering assist mechanism as well as the clutch means therefor. In particular, a pair of coaxial bevel gears 58 and 59 are provided within housing 57, these gears being continuously driven in opposite directions by a bevel pinion 61 mounted between them. This bevel pinion is supported on spindle 62 which is rotatably mounted in end wall 63 of the housing by bushing 64, and the opposite end of spindle 62 carries a bevel gear 65 which is driven by gear 66 rotatably mounted in a bracket 67 secured to housing 57, gears 65 and 66 being enclosed by an extension 68 of the housing. Gear 66 is driven from the vehicle engine (not shown), for example by means of a belt pulley 69, a drive shaft 71, and universal joints 72 and 73. With this driving means, it will be seen that when the engine is running gears 58 and 59 will be continuously driven in opposite directions. It will be understood that while one possible form of driving means for gears 58 and 59 is shown, other forms are contemplated within the scope of the invention, and in particular a variable speed drive could be provided.

Gears 58 and 59 are rotatably mounted on the steering column, and clutch means are provided for engaging one or the other of said gears upon appropriate movement of the control valve 37. As shown, a pair of fluid actuated friction clutch members 74 and 75 are provided for gears 58 and 59 respectively, these clutches being keyed or otherwise non-rotatably secured to steering column 11. In the illustrated embodiment, the steering column has a splined portion 76 on which clutch members 74 and 75 are axially movable, the splined portion of clutch member 75 comprising a sleeve 77 which rotatably supports the hub of gear 59. The hub of gear 58 is in turn rotatably supported on the hub of gear 59, these gears being held against axial movement by retainer 78 and spacer 79.

The means for actuating clutches 74 and 75, includes a pair of annular piston members 81 and 82 respectively, these members being enclosed within housing 57 and forming chambers 83 and 84 which are connected to control ports 42 and 43 respectively by conduits 85 and 86. Ball race assemblies 87 and 88 are disposed between the actuating pistons and their respective clutch members to allow relative rotation therebetween. It will therefore be seen that when either chamber 83 or 84 is pressurized, its corresponding piston will move inwardly, engaging a clutch member with one of the gears to urge the steering column 11 in one direction of rotation. It should be noted that since clutch members 74 and 75 are of the frictional type, the torque applied to the steering column by gears 58 or 59 will be dependent upon the clutching force which in turn is controlled by the pressure within chambers 83 and 84. As indicated above, the amount of fluid pressure within these chambers will be controlled by the amount of opening of control ports 42 and 43, this opening depending upon the movement of valve 37 which is controlled by control linkage 16.

In operation, when the engine is started the gears 58 and 59 will be continuously rotated by pinon 61 which is driven from the engine. Clutches 74 and 75 will however be disengaged since the normal position of valve 37, as shown in Figure 1, will be such as to prevent chambers 83 or 84 from becoming pressurized. With no torque being applied to cross shaft 14, there will be no angular displacement between the outer ends of shafts 14 and 17, and arm 31 will remain in a neutral position, thus holding control valve 37 likewise in a neutral position. Upon manual turning of steering wheel 12, cross shaft 14 will turn against the road friction transmitted to the outer end of pitman arm 15 by drag link 29, and the torsional force thus created in cross shaft 14 will cause an angular deflection between the outer end of the cross shaft and the outer end of control shaft 17 which is fixed only at its inner end 18 to the cross shaft.

The resulting angular displacement between pitman arm 15 and control pitman arm 22 will cause pivoting movement of valve actuating arm 31 about its pivot pin 30. As will be seen from an examination of Figure 2, the intermediate location of pin 39, which connects control pitman arm 22 with arm 31, between pivot pin 30 and pivot point 33 will cause a multiplication of angular movement of arm 31 over that of arm 22. The degree of this multiplication will of course depend on the relative positions of pivot pin 30, pin 39 and pivot point 33, and these distances may of course be varied to suit the particular requirements, but in any case the result will be an increase in the sensitivity of control valve 37 to distortions in cross shaft 14.

The movement of pivot point 33 will cause sliding movement of valve 37 within its housing 38. Let us assume that the steering column 11 is rotated in the manner shown by arrow 89 in Figure 1, and that the worm and sector arrangement is such that this rotation will cause clockwise movement of the pitman arm 15 and control pitman arm 22 as shown by the arrow 91 in Figure 1. Since control pitman arm 22 will move angularly a greater distance than pitman arm 15, pin 39 will be swung to the left relative to the pitman arm 15, thus swinging arm 31 counterclockwise relative to pivot pin 31, as shown by the arrow 92 in Figure 1. This will move valve 37 to the left, connecting port 42 to inlet port 39 in connecting port 43 to exhaust port 41. Chamber 83 will thus become pressurized and clutch actuating piston 81 will move inwardly, engaging clutch 74 with continuously rotating gear 58. With shaft 71 being driven in the direction shown by arrow 93, gear 58 will be clutched to steering shaft 11 in such a manner as to aid the original steering effort.

It should be noted at this point that the mount of steering assistance applied to the steering column 11 is dependent upon the amount of resistance encountered in the original steering effort, since this controls the distortion of cross shaft 14 and the movement of valve 37 which in turn controls the amount of pressure applied to the friction clutch. If absolutely no resistance is encountered during turning, there will be no relative angular movement between pitman arm 15 and pitman control arm 22, and arm 31 will thus not move angularly about its pivot pin 30. In this event, pivot point 33 will remain in its position which is on the axis of cross shaft 14, so that pitman arm 15, control pitman arm 22 and actuating arm 31 will swing in unison around the cross shaft axis without disturbing the neutral position of valve 37.

Assuming that steering assistance has been given in the manner described above, upon the attainment of a stable steering condition, that is with a reduction of the torsional forces in cross shaft 14 due to resistance to steering effort, pitman arm 15 and control pitman arm 22 will be returned to their original relative position, and pivot point 33 will thus be returned to its original position on the axis of cross shaft 14. Valve 37 will thus return to its neutral position shutting off pressure fluid from chamber 83 as well as from chamber 84. The clutching force on clutch 74 will thus be reduced and gear 58 will again rotate idly along with gear 59. When the steering wheel 12 is turned in the opposite direction, a similar sequence of events will occur with respect to clutch 75 and gear 59, the latter serving to urge steering column 11 in the opposite direction.

It should be pointed out that although a particular type of valve is shown in the illustrated embodiment for controlling the clutches, the invention contemplates the use of other types of valves, for example those having ports which would vent the clutch actuating chambers 83 and 84 at all times when not in use. It is of course possible to vary the amount of steering assistance by properly choosing the supply pressure for the fluid as well as the relative dimensions of the clutch actuating pistons and the other parts of the mechanism. It should also be noted that the friction clutch and gear mechanism enclosed within housing 57 could as well be applied at another portion of the steering linkage instead of on the steering column 11 as shown.

While it will be apparent that the preferred embodiment of the invention herein disclosed is well calculated to fulfill the objects above stated, it will be appreciated that the invention is susceptible to modification, variation and change without departing from the proper scope or fair meaning of the subjoined claims.

What is claimed is:

1. In an assistance mechanism, a shaft, means for manually turning said shaft, a first arm connected to one portion of said shaft, means for connecting said arm to a mechanism to be moved, a second arm connected to another portion of said shaft axially spaced from said first portion, a fluid control valve movable from a neutral position in either direction to an actuating position, means connecting said arms to said valve, said connecting means causing movement of said valve from its neutral position to one of its actuating positions upon relative angular movement between said arms, a pair of oppositely rotating gears, means for continuously rotating said gears, friction clutches for clutching said gears to drive said shaft, fluid actuating means for said clutches, and fluid connecting means between said control valve and said clutch actuating means, movement of the control valve into one of its actuating positions causing engagement of a corresponding one of said clutches whereby its respective gear urges said shaft in the direction of manual turning.

2. In a steering assist mechanism, a steering shaft, means for manually turning said shaft, a cross shaft driven by said steering shaft, a first arm connected to one portion of said cross shaft, means for connecting said arm to a steering linkage, a second arm connected to another portion of said cross shaft axially spaced from said first portion, a fluid control valve movable from a neutral position in either direction to an actuating position, means connecting said arms to said valve, said connecting means causing movement of said valve from its neutral position to one of its actuating positions upon relative angular movement between said arms, a pair of oppositely rotating gears, means for continuously rotating said gears, friction clutches for clutching said gears to drive said cross shaft, fluid actuating means for said clutches, and fluid connecting means between said control valve and said clutch actuating means, movement of the control valve into one of its actuating positions causing engagement of a corresponding one of said clutches whereby its respective gear urges said shaft in the direction of manual turning.

3. In an assistance mechanism, a first shaft, means at one portion of said shaft for manually turning the shaft, a first arm connected to said shaft at a point spaced from said manual turning means, means for connecting said arm to a mechanism to be moved, a second shaft coaxially disposed within said first shaft, said second shaft being fixed to said first shaft in the vicinity of said manual turning means, the remainder of said second shaft being freely rotatable within said first shaft, a second arm connected to said second shaft, a fluid control valve movable from a neutral position in either direction to an actuating position, means connecting said arms to said valve, said connecting means causing movement of said valve from its neutral position to one of its actuating positions upon relative angular movement between said arms, a pair of oppositely rotating gears, means for continuously rotating said gears, friction clutches for clutching said gears to drive said first shaft, fluid actuating means for said clutches, and fluid connecting means between said control valve and said clutch actuating means, movement of the control valve into one of its actuating positions causing engagement of a corresponding one of said clutches whereby its respective gear urges said first shaft in the direction of manual turning.

4. In an assistance mechanism, a shaft, means for manually turning said shaft, a first arm connected to one portion of said shaft, means for connecting said arm to a mechanism to be moved, a second arm connected to another portion of said shaft axially spaced from said first portion, a fluid control valve having a supply port, an exhaust port, and a pair of control ports, said valve being movable from a neutral shutoff position in either direction a varying distance to permit varying rates of fluid to flow from said supply port to one or the other of said control ports and to exhaust the control port not being supplied, means connecting said arms to said valve, said connecting means causing movement of said valve from its neutral position a distance depending upon the relative angular movement between said arms, a pair of oppositely rotating gears, means for continuously rotating said gears, friction clutches for clutching said gears to drive said shaft, fluid actuating means for said clutches, and fluid connecting means between said control ports and said clutch actuating means, movement of said control valve from its neutral position causing engagement of one or the other of said friction clutches, the force of said engagement being dependent upon the travel of said control valve.

5. In a steering assist mechanism, a steering shaft, means for manually turning said shaft, a cross shaft driven by said steering shaft, a first arm connected to one portion of said cross shaft, means for connecting said arm to a mechanism to be moved, a second arm connected to another portion of said cross shaft axially spaced from said first portion, a fluid control valve movable from a neutral position in either direction to an actuating position, means connecting said arms to said valve, said connecting means causing movement of said valve from its neutral position to one of its actuating positions upon relative angular movement between said arms, a pair of oppositely rotating gears coaxial with said steering shaft, means for continuously rotating said gears, friction clutches for clutching said gears to drive said steering shaft, fluid actuating means for said clutches, and fluid connecting means between said control valve and said clutch actuating means, movement of the control valve into one of its actuating positions causing engagement of a corresponding one of said clutches whereby its respective gear urges said steering shaft in the direction of manual turning.

6. In a steering assist mechanism for motor vehicles, a steering shaft, means for manually turning said shaft, a first arm non-rotatably connected to one portion of said shaft, means for connecting said arm to a mechanism to be moved, a second arm non-rotatably connected to another portion of said shaft axially spaced from said first portion, a fluid control valve movable from a neutral position in either direction to an actuating position, means connecting said arms to said valve, said connecting means causing movement of said valve from its neutral position to one of its actuating positions upon relative angular movement between said arms, a pair of oppositely rotating gears, means driven by said vehicle engine for continuously rotating said gears, friction clutches for clutching said gears to drive said shaft, fluid actuating means for said clutches, and fluid connecting means between said control valve and said clutch actuating means, movement of the control valve into one of its actuating positions causing engagement of a corresponding one of said clutches whereby its respective gear urges said shaft in the direction of manual turning.

7. In an assistance mechanism, a shaft, means for manually turning said shaft, a first arm connected to one portion of said shaft, means for connecting said arm to a mechanism to be moved, a second arm connected to another portion of said shaft axially spaced from said first portion, a fluid control valve movable from a neutral position varying distances in either direction for actuating purposes, a valve actuating arm having one end pivotally mounted on said first arm, a pin and slot connection between said second arm and an intermediate portion of said valve actuating arm, the other end of said valve actuating arm being connected to said valve, whereby the relative angular movement between said first and second arms is amplified in said actuating arm, said valve being in its neutral position when there is no torsional strain in said control shaft, a pair of oppositely rotating gears, means for continuously rotating said gears, friction clutches for clutching said gears to drive said shaft, fluid actuating means for said clutches, and fluid connecting means between said control valve and said clutch actuating means, movement of the control valve into one of its actuating positions causing engagement of a corresponding one of said clutches whereby its respective gear urges said shaft in the direction of manual turning.

8. The combination according to claim 7, the connecting means between said valve actuating arm and said control valve including a pivotal connection, said connection being disposed substantially on the axis of said control shaft when said control valve is in neutral position, whereby said control valve will remain in neutral position when said first arm, second arm, and valve actuating arm moved in unison.

9. In a steering assist mechanism for motor vehicles, a steering shaft, means for manually turning said shaft, a cross shaft, gearing connecting said cross shaft to said steering shaft for manual rotation therewith, a valve control shaft disposed within said cross shaft, said valve control shaft being joined to said cross shaft at one portion thereof, a pitman arm fixed to said cross shaft at a point axially spaced from the juncture of said shafts, a control pitman arm fixed to said valve control shaft, a fluid control valve movable from a neutral shutoff position varying distances in either direction for actuating purposes, a valve actuating arm pivotally mounted at one end on said pitman arm, a pin and slot connection between said control pitman arm and an intermediate point of said valve actuating arm, the other end of said valve actuating arm having a pivotal connection with said valve, said pivot being on the axis of said cross shaft when the valve is in neutral position, a pair of oppositely rotating gears coaxial with said steering shaft, means driven by said vehicle engine for continuously rotating said gears, friction clutches for clutching said gears to said steering shaft, fluid actuating means for said clutches, and fluid connecting means between said control valve and said clutch actuating means, movement of the control valve from its neutral position causing engagement of a corresponding one of said clutches whereby its respective gear urges said shaft in the direction of manual turning.

10. The combination according to claim 9, the frictional force of said clutches being dependent upon the rate of fluid supplied to said clutch actuating means, and means in said control valve for varying said fluid rate in accordance with the distance of control valve travel.

References Cited in the file of this patent

UNITED STATES PATENTS 2,427,340    Allison _____ Sept. 16, 1947

FOREIGN PATENTS 822,845    Germany _____ Nov. 26, 1951